Figure 11:
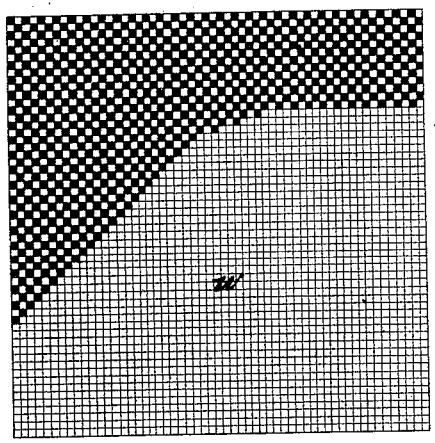
Figure 12:
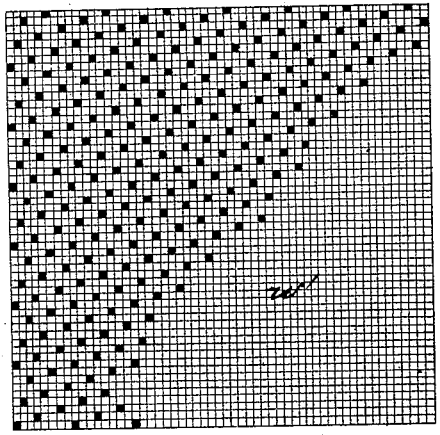
Figure 15:
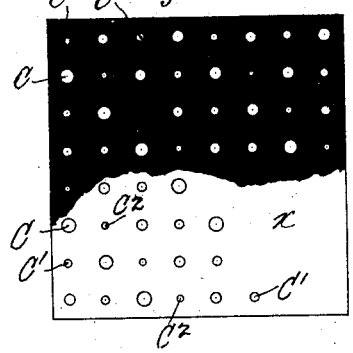

No. 703,849. Patented July 1, 1902.
J. SZCZEPANIK.
METHOD OF PRODUCING WEAVING DIAGRAMS.
(Application filed Dec. 20, 1898.)
(No Model.) 4 Sheets—Sheet 1.
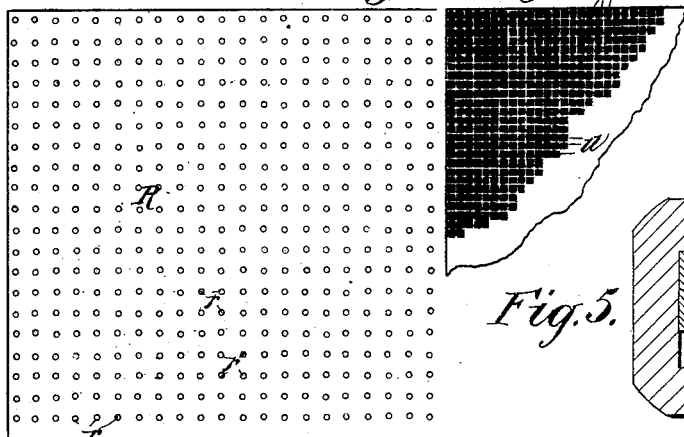
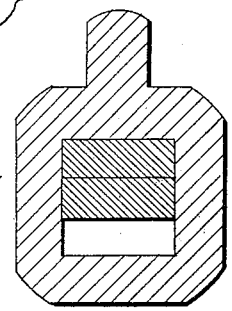
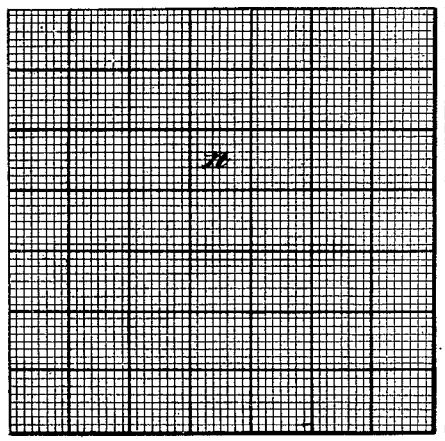
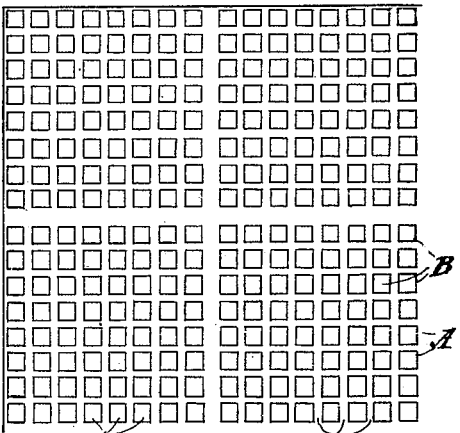
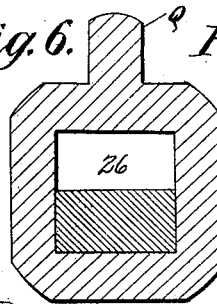
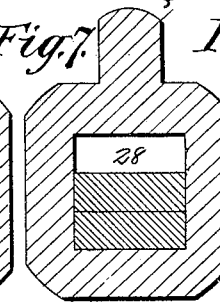
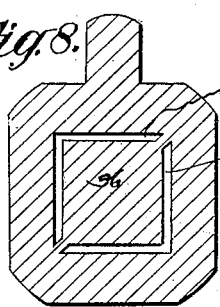
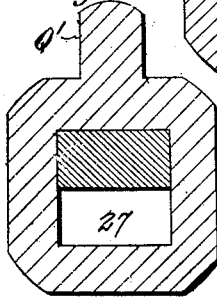
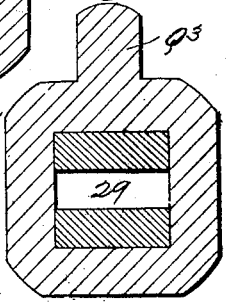

No. 703,849. Patented July 1, 1902.
J. SZCZEPANIK.
METHOD OF PRODUCING WEAVING DIAGRAMS.
(Application filed Dec. 20, 1898.)
(No Model.) 4 Sheets—Sheet 2.

Witnesses

Inventor
Jan Szczepanik.
by
Atty.

No. 703,849. Patented July 1, 1902.
J. SZCZEPANIK.
METHOD OF PRODUCING WEAVING DIAGRAMS.
(Application filed Dec. 20, 1898.)
(No Model.) 4 Sheets—Sheet 3.
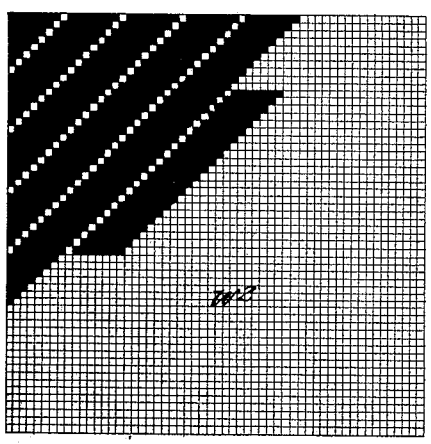
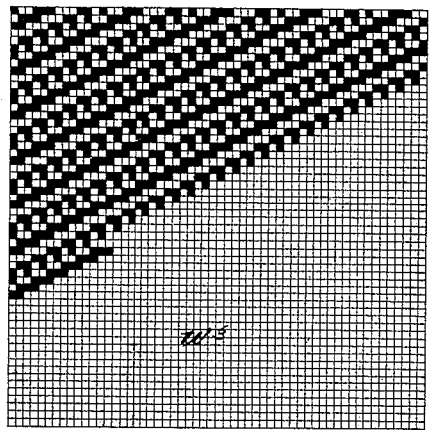
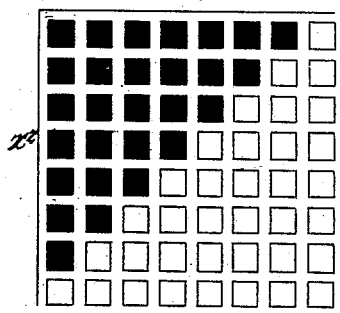
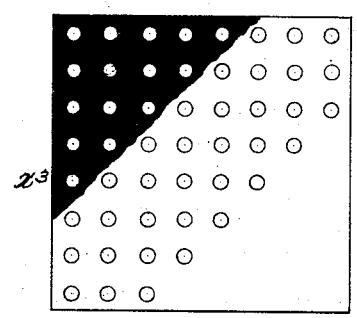
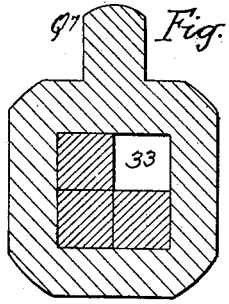
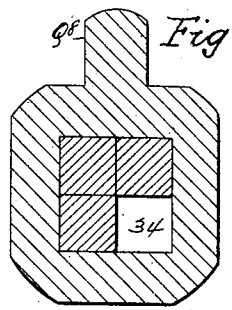
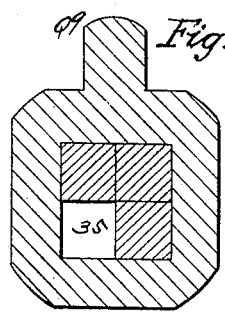

No. 703,849. Patented July 1, 1902.
J. SZCZEPANIK.
METHOD OF PRODUCING WEAVING DIAGRAMS.
(Application filed Dec. 20, 1898.)
(No Model.) 4 Sheets—Sheet 4.

United States Patent Office.

JAN SZCZEPANIK, OF VIENNA, AUSTRIA-HUNGARY, ASSIGNOR, BY DIRECT AND MESNE ASSIGNMENTS, TO THE BARMER BANK-VEREIN, HINSBERG, FISCHER & COMP., OF BARMEN, RHENISH PRUSSIA, GERMANY, A CORPORATION OF GERMANY.

METHOD OF PRODUCING WEAVING-DIAGRAMS.

SPECIFICATION forming part of Letters Patent No. 703,849, dated July 1, 1902.

Application filed December 20, 1898. Serial No. 699,864. (No specimens.)

*To all whom it may concern:*

Be it known that I, JAN SZCZEPANIK, a subject of the Emperor of Austria-Hungary, residing at Vienna, in the Province of Lower Austria, in the Empire of Austria-Hungary, have invented certain new and useful Improvements in the Method of Producing Weaving-Diagrams; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

In making weaving-diagrams it has heretofore been the practice to first sketch the pattern on diagram-paper ruled as required and then to color this sketch by hand and alter the outline so as to completely fill all squares that are at least half covered by the design. Then the different portions of the figure and the ground are provided with bindings, also indicated by colored squares and painted in by hand. I have used photographic devices for producing a similar effect, described in my application for patent, Serial No. 629,255, filed March 25, 1897, in which I make use of a screen photographically made, and through which screen the picture is projected on a sensitized medium and after a short exposure this image rendered permanent by well-known means.

In order to render bindings visible on the sensitized medium, binding or shading screens are employed that have fields of varying translucency corresponding to the kind of binding to be produced and are placed in front of or behind the screen proper, both being placed between the plate-holder and lens and causing the various squares produced in the image to have a density depending on the transparency of the binding-screen.

Now the present invention has for its object to perfect the mode of making photographic weaving-diagrams, whereby the squares indicating the colors and the bindings are more sharply and accurately shown, especially by outline figures, rather than varying degrees of intensity of the sensitized medium. There is also a great reduction in the number of appliances required, which are much cheaper and lighter, and at the same time the drawback caused by the grain in gelatin screens, which have been heretofore used, is obviated.

The present method is based on the optical fact that light transmitted from all parts of the object through a lens by rays that are focused and converge meet in the focal plane to produce the image in that plane, these rays forming bundles or cones of light whose apices lie in the focal plane. Now if a plate with a small aperture be placed in the focal plane a complementary cone or bundle of rays is formed on the other side whose basal section— that is, one parallel with the perforated plate— is of a shape similar in all respects to the diaphragm-opening at the lens. This arrangement will resemble a pin-hole camera combined and located within an ordinary camera, the source of light of the pin-hole camera being that light coming through the objective, the relative intensity of which light throughout its field varies in accordance with that reflected from the object. If the diaphragm be circular, square, triangular, &c., the image on the sensitized plate behind the pin-hole will have a corresponding shape. Now a perforated plate placed in the focal plane will constitute as many pin-hole cameras as there are apertures in the plate, each reproducing the diaphragm outline—say, for example, a square—while at the same time the intensity of the light passing through each perforation will depend upon the color value of that part of the object from which it is primarily reflected and subsequently focused at the pin-hole. I use such an arrangement with a perforated plate in substantially the focal plane of the objective and behind this place a focusing or ground-glass plate that is ruled like pattern-paper, each aperture in the perforated plate registering with a square on the ground glass.

Referring to the drawings, Figure 1 represents a portion of a perforated plate. Figs.

Figure 25:
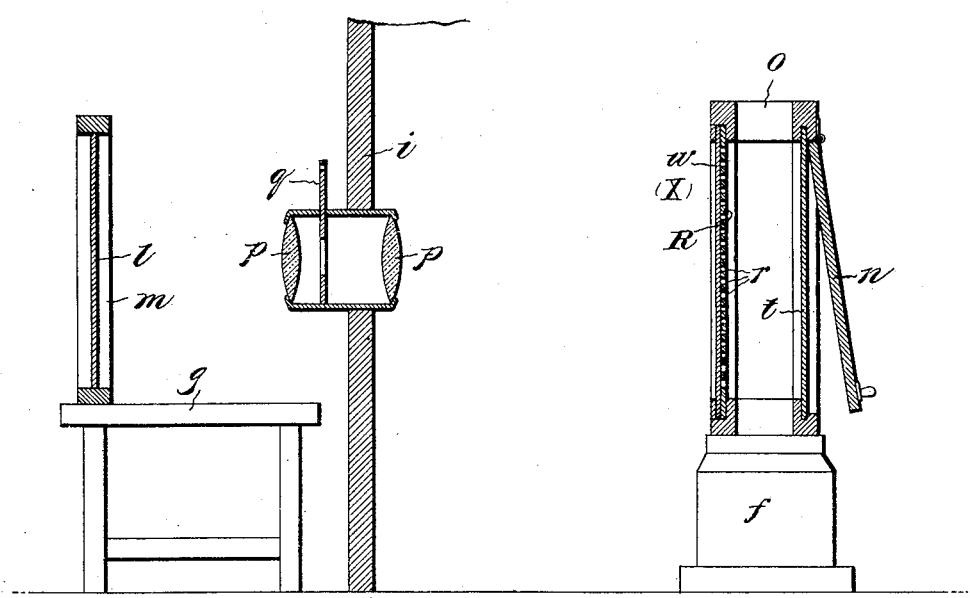

2, 3, and 4 represent portions of developed or fixed sensitized media obtainable by the method herein described. Figs. 5 to 10 are diaphragms for indicating weaving-stitches. Figs. 11 to 18 are screens or plates for producing and indicating on the sensitized medium the binding-stitches. Figs. 19 to 24 are other diaphragms, and Fig. 25 shows the method of carrying out the invention.

The pattern or object $l$ to be photographed, mounted in a suitable frame $m$ on a stand $g$, is focused on a ground-glass or focusing screen $n$, ruled similar to Fig. 3, the perforated plate R shown in Fig. 1 being located substantially in the focal plane and a diaphragm $q$ placed in the objective $p$ in the wall $i$ of a suitable dark room or chamber. Said diaphragm has a square hole in it, and the object or the focusing-screen $n$, that is in the frame O on the stand $f$ in the dark room, is moved to focus on the focusing-screen so that the image of the object will cut the required number of squares in weft or warp direction. Should it be desired to reduce the one dimension of the image either in warp or weft direction, this can readily be done by means of a cylinder-lens objective. When the image is suitably focused, the focusing-screen is removed and replaced by the sensitized medium $t$, as a photographic plate or paper. Now after a short exposure the image will be produced on the sensitized medium divided into squares. It is also desirable that such an image should indicate binding-stitches or the various colors of the design, or both, in such form as to unmistakably distinguish between them, to which end I aim not to indicate them by gradations of tone or density in the image, but rather by different outlines, so as to reliably show them in the developed or fixed image, preferably by various-shaped outlines in the several squares. I thus reduce the liability to error in reading the diagrams and also reduce the number of appliances and obviate the drawback produced by the grain of photographic screens which are placed in front of the image or behind a negative that is to be copied and through which and the screen light is passed.

When a diaphragm with a square opening is used in the objective, there will be shown on the focusing-screen the image of a square opposite each one of the perforations $r$ in the plate R, (shown in Figs. 1 and 25,) and when these images are somewhat smaller than the rulings on the ground-glass plate a result will be produced similar to Fig. 2, in which are shown dark squares $u$, separated from one another by lines or transparent portions $v$. Now in order to produce dark rulings similar to those on the ground glass a special diaphragm $Q^{10}$ (shown in Fig. 8) is used, the square opening in which is filled by a smaller square 36, so as to leave peripheral slits 37, through which the light will pass, and when the images produced by such a diaphragm coincide with the rulings on the ground glass a result is obtained similar to that shown in Fig. 3; but if these images are smaller than the rulings on the focusing-screen then outline-squares A are produced, separated by intermediate spaces or a network of transparent lines B, similar to Fig. 4.

To distinguish colors in the diagram, they are indicated by various outlines, such as triangles, large and small circles, slits at different angles, or any other distinguishing outline.

In order to enable each separate color to be indicated on the sensitized paper, color-filters can be employed to cut out one or more colors. A stop having one form is then used and an exposure made. The color screen or screens are then changed and another form of stop used, &c., so that each separate color not cut out by the screens will be photographed in succession, or in lieu of this the pattern to be copied may be cut into portions which are placed accurately upon one another, constituting the so-called "masked" copy and successively photographed, whereby the time required to make the pattern is considerably shortened and the use of color-screens avoided. The bindings are also to be indicated on the pattern, and this can be done by the use of binding-plates $w$ $w'$ $w^2$ $w^3$, which are made according to the binding to be used, Figs. 11 to 14 illustrating portions of plates for some of the ordinary bindings. These plates are arranged close to the perforated plate, Fig. 1, and cover up certain of the perforations, so that the photographic copy will show this arrangement of stitches besides those indicating the design.

$w^2$, Fig. 14, illustrates a combined binding made by photographing the same surface with two binding-plates one after another or using them simultaneously. Such binding-plates are preferably produced by photography, as negatives have the advantage that a small number of them can be used for making the various kinds of bindings, either by using them singly or two or more combined.

Figure 16:
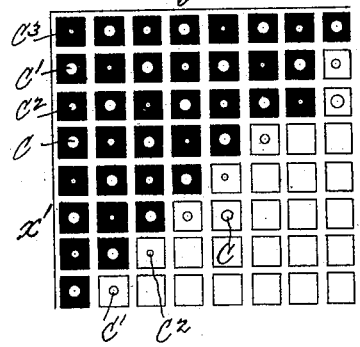
Figure 19:
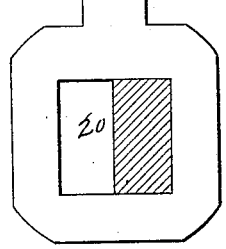
Figure 20:
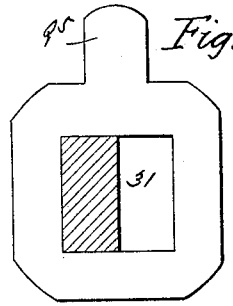
Figure 21:
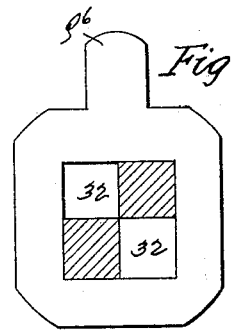

For shaded patterns different degrees of translucency indicate the different bindings. For this purpose binding-plates are used whose perforations or transparent portions may or may not vary in size, so that the amount of light passing through them varies, some forms of which are illustrated at $x$, $x'$, $x^2$, and $x^3$ in Figs. 15 to 18, the clear portions or holes C designed to register with the rulings on the ground-glass plate. In order to first outline the ruling on the negative, a plate, such as $x'$, Fig. 16, is used and covered with a plate, such as $x^2$, Fig. 17, and one exposure made, whereby the ruling of diagram-paper is first copied. Then a plate, $x^3$, Fig. 18, or $x$, Fig. 15, replaces plate $x^2$, Fig. 17, and an exposure is made, the various sizes of the perforations or clear portions C, C', $C^2$, or $C^3$ each size corresponding to a different stitch or two or more sizes combining to make a combined stitch, admitting to the sensitized plate different quantities of light, whereby different exposures are obtained, Fig. 15 or 16.

Two or more bindings can also be indicated by using binding-plates, such as shown in Figs. 11 to 14, by varying the exposure with the different plates either by varying the length of the exposure or by varying the size of the diaphragm, or both.

In all of the methods described the several bindings will be indicated on the negative by different intensities of the little squares that indicate each stitch.

When a diaphragm is to be made for a two-weft fabric in which each weft is represented by a single line, the above-described binding-plates or cover-plates are used, in which portions of their aperture is cut out, so as to expose only a certain portion of each diaphragm-opening at a time and to copy in this portion the desired binding, Figs. 6 and 9 illustrating such diaphragms Q and $Q^2$ having only one-half of the usual square aperture, as at 26 and 27, by means of which each square on the negative will be cut in half longitudinally and a binding copied in each portion. In like manner the diaphragms $Q^2$ and $Q^3$, Figs. 7 and 10, having only one-third the usual square aperture, as at 28 and 29, will divide the image of the squares into three parts for three-weft fabrics, while the diaphragms $Q^4$ and $Q^5$, Figs. 19 and 20, will serve for double fabrics having a double warp and a single weft, having the usual square aperture divided vertically, leaving openings 30 and 31, while those diaphragms $Q^6$, $Q^7$, $Q^8$, and $Q^9$ (shown in Figs. 21 to 24) are for double fabrics having double warp and weft and are provided with apertures 32, 33, 34, and 35 one-fourth the size of the usual square opening, so that each square represented on the sensitized medium may have four different thread-crossings indicated therein, one in each quadrant.

Having thus described my invention, what I claim as new therein, and desire to secure by Letters Patent, is—

1. The method of producing patterns, which consists in focusing the object on a suitable focusing-plate, replacing the same by a sensitized medium, breaking up the image into a suitable number of divisions and giving a different shape to groups of these divisions, substantially as set forth.

2. The method of producing patterns, which consists in focusing the object on a suitable focusing-screen, replacing the same by a sensitized medium, breaking up the image into a suitable number of divisions and giving a different shape to groups of these divisions by suitable diaphragms, substantially as set forth.

3. The method of producing patterns, which consists in focusing the object or figure on a screen, breaking up the image into a predetermined number of divisions by a perforated plate in the path of the light from the focused image, determining the form of these divisions on the sensitive medium by the form of the light-apertures, and intensifying certain sets of divisions by blocking out perforations in the screen, substantially as described.

4. The method of producing patterns, which consists in focusing the object or figure on a suitable screen, breaking up the image into a suitable number of divisions by a perforated plate in the path of light, determining the form of these divisions by the form of the light-apertures and varying the intensity of certain sets of divisions, substantially as set forth.

5. The method of producing patterns, which consists in focusing the object on a suitable screen, replacing the latter by a sensitive medium, breaking up the image into a suitable number of divisions by a perforated plate, determining the form of the divisions by the form of the light-aperture, and blocking out certain of them and varying the intensity of others by varying the intensity of light admitted through color-screens, substantially as set forth.

6. The method of producing patterns, which consists in focusing the object on a suitable screen and photographing the image thus produced by a series of pin-hole cameras, substantially as set forth.

7. The method of producing patterns, which consists in focusing the object on a suitable screen and photographing the image by a series of pin-hole cameras arranged in the order of a weaving-crossing, substantially as set forth.

8. The method of producing patterns, which consists in focusing an object on a screen and photographing the image by more than one series of pin-hole cameras arranged in the order of a weaving-crossing, each series of pin-hole cameras organized to produce images of different intensity from those of the other series, substantially as set forth.

9. The method of producing patterns, which consists in focusing an object and photographing the image formed, by a series of pin-hole cameras arranged substantially in the focal plane, substantially as set forth.

10. The method of producing patterns, which consists in focusing an object, photographing the image formed, by pin-hole cameras arranged substantially in the focal plane whereby the image is broken up into a number of parts corresponding to the number of pin-hole cameras, and determining the outline of the images formed by each pin-hole camera by the form of the bundle of rays of light to form the image, substantially as set forth.

11. The method of producing patterns, which consists in focusing an object, photographing the image formed, by one or more series of pin-hole cameras arranged substantially in the focal plane, thereby producing a subdivided image, varying the intensity of certain divisions of said image by varying sizes of the apertures of the pin-hole cameras, determining the form of the image produced by each pin-hole camera by the form of the bundle of rays of light admitted, and subdividing the images of the pin-hole cameras by subdividing the stop at the objective, substantially as set forth.

12. The method of producing patterns, which consists in focusing an object, subdividing the image by a perforated plate, producing an image subdivided into squares by means of a suitable diaphragm, and indicating binding-stitches by closing certain of the apertures in said perforated plate and subdividing each image behind the perforated plate and indicating thereon the particular stitch by a suitable diaphragm, substantially as set forth.

13. The method of producing patterns, which consists in forming on a sensitized medium an actinic impression to represent diagram-paper, transmitting light from a suitable object through a lens and a perforated plate to indicate said object on the representation of the diagram-paper on the sensitized medium, and also indicating binding-stitches thereon by suitable actinic impressions, substantially as set forth.

14. The method of producing patterns, which consists in forming on a sensitized medium an actinic impression to represent diagram-paper, transmitting light from a suitable object through a lens, a screen and perforated plate to indicate said object on the representation of the diagram-paper on the sensitized medium, and also indicating binding-stitches thereon, substantially as set forth.

15. The method of producing patterns, which consists in forming on a sensitized medium an actinic impression to represent diagram-paper, transmitting light from a suitable object through a diaphragm, lens and a screen whose transparent portions are of different sizes, all those of the same size arranged in the order of a weaving-crossing and a perforated plate whose perforations register with the divisions of the representation of the diagram-paper, whereby actinic impressions are made in said divisions differing in intensity, those of the same intensity arranged in the order of a weaving-crossing, substantially as set forth.

16. The method of producing patterns, which consists in forming on a sensitized medium an actinic impression to represent diagram-paper, transmitting light from a suitable object, through a diaphragm and a lens, and a screen whose transparent portions are of different sizes, all those of the same size arranged in the order of a weaving-crossing, and a perforated plate whose perforations register with the divisions of the representation of said diagram-paper, the said diaphragm capable of subdividing each division of the representation of the diagram-paper and indicating in said divisions different weaving-crossings, substantially as set forth.

In testimony that I claim the foregoing as my invention I have signed my name in presence of two subscribing witnesses.

JAN SZCZEPANIK.

Witnesses:
SAMUEL KLOTSCHKY,
ALVESTO S. HOGUE.